United States Patent
Kusakabe

(10) Patent No.: US 10,364,736 B2
(45) Date of Patent: Jul. 30, 2019

(54) FLUID CONTROL VALVE ASSEMBLY

(71) Applicant: NIPPON THERMOSTAT CO., LTD., Kiyose-shi, Tokyo (JP)

(72) Inventor: Fumito Kusakabe, Tokyo (JP)

(73) Assignee: NIPPON THERMOSTAT CO., LTD., Kiyose, Tokyo (JP)

(*) Notice: Subject to any disclaimer, the term of this patent is extended or adjusted under 35 U.S.C. 154(b) by 0 days.

(21) Appl. No.: 15/241,400

(22) Filed: Aug. 19, 2016

(65) Prior Publication Data

US 2016/0356203 A1    Dec. 8, 2016

Related U.S. Application Data

(63) Continuation of application No. 13/581,468, filed as application No. PCT/JP2011/052286 on Feb. 3, 2011, now Pat. No. 9,464,727.

(30) Foreign Application Priority Data

Apr. 27, 2010 (JP) .................... 2010-102556

(51) Int. Cl.
  *F01P 7/14* (2006.01)
  *F01P 7/16* (2006.01)
  (Continued)

(52) U.S. Cl.
  CPC ............. *F01P 7/16* (2013.01); *F16K 27/02* (2013.01); *F16K 27/0254* (2013.01);
  (Continued)

(58) Field of Classification Search
  USPC ...... 236/92 R, 92 C, 92 D, 34.5, 93 R, 93 A; 138/26–31; 251/335.1, 335.2, 335.3;
  (Continued)

(56) References Cited

U.S. PATENT DOCUMENTS 1,059,370 A    4/1913   Johnson
2,734,462 A    2/1956   Schaefer
(Continued)

FOREIGN PATENT DOCUMENTS

JP    S60-131625 U    9/1985
JP    H02-011289 U    1/1990
JP    2004-263586 A   9/2004

*Primary Examiner* — Robert K Arundale
*Assistant Examiner* — Daphne M Barry
(74) *Attorney, Agent, or Firm* — Sughrue Mion, PLLC; Richard C. Turner

(57) ABSTRACT

Provided is a fluid control valve assembly which reduces pressure loss of a fluid passage line including a fluid control valve, thereby mini-minimizing the pressure for a fluid to pass therethrough to ensuring a required amount of flow without upsizing the overall assembly. The fluid control valve assembly includes an upstream pipe forming an upstream fluid passageway tilted at a predetermined angle relative to a valve axis to face an upstream chamber. The upstream chamber is formed upstream of a valve portion which has a valve seat and a valve body in a valve housing and which can open and close the fluid passageway. The wall surface of the upstream chamber is integrated with a swelling, which is projected in the chamber to thereby rectify and guide the fluid flowing therein through the upstream pipe so that the fluid smoothly flows to the valve portion.

20 Claims, 6 Drawing Sheets

(51) Int. Cl.
*F16K 27/02* (2006.01)
*F16K 31/00* (2006.01)
*G05D 23/02* (2006.01)

(52) U.S. Cl.
CPC ......... *F16K 31/002* (2013.01); *G05D 23/022* (2013.01); *F01P 2007/146* (2013.01)

(58) Field of Classification Search
USPC ........... 123/41.08, 41.09, 41.1; 165/297, 298
See application file for complete search history.

(56) References Cited

U.S. PATENT DOCUMENTS

| | | | |
|---|---|---|---|
| 2,833,478 A * | 5/1958 | Middleton | G05D 23/1333 236/34 |
| 3,482,267 A * | 12/1969 | Liljendahl | E03D 3/06 251/331 |
| 3,583,430 A * | 6/1971 | Toennesen | F16K 15/142 137/468 |
| 4,376,315 A * | 3/1983 | Badger | B64D 11/02 251/5 |
| 4,431,133 A | 2/1984 | Roberson, Sr. | |
| 5,038,724 A * | 8/1991 | Neal | F01P 3/202 123/41.08 |
| 6,189,798 B1 * | 2/2001 | Sano | F01P 11/16 236/34.5 |
| 6,843,209 B2 | 1/2005 | Miyagawa et al. | |
| 6,938,586 B2 * | 9/2005 | Manners | F01P 7/16 123/41.1 |
| 7,445,161 B2 * | 11/2008 | Inoue | F01P 7/16 236/101 C |
| 7,721,974 B2 | 5/2010 | Inoue | |
| 8,186,604 B2 * | 5/2012 | Park | F01P 7/16 236/34.5 |
| 2002/0170610 A1 | 11/2002 | Webber | |
| 2010/0012738 A1 | 1/2010 | Park | |

* cited by examiner (a)

(b)

FLUID CONTROL VALVE ASSEMBLY

CROSS-REFERENCE TO RELATED APPLICATIONS

The present application is a continuation of application Ser. No. 13/581,468, filed on Aug. 27, 2012, which is a National Stage of international application no. PCT/JP2011/052286, filed on Feb. 3, 2011, which in turn claims priority from Japanese patent application no. 2010-102556, filed on Apr. 27, 2010, the entire disclosures of which are hereby incorporated by reference herein.

BACKGROUND OF THE INVENTION

Technical Field

The present invention relates to a fluid control valve assembly adapted for use in a thermostat valve device that switches the flow of a coolant according to the coolant temperature, in a cooling device for an internal combustion engine for an automobile, for example (hereinafter "automobile engine").

Description of the Background Art

In automobile engines, for example, a water-cooled cooling device employing a radiator is commonly used to cool the engine. Conventionally, in a cooling device of this type, a thermostat valve device employing a thermal expansion unit that adjusts the amount of coolant circulated to the radiator side is used to be able to control the temperature of the coolant introduced into the engine.

More specifically, the thermostat valve device using the thermal expansion unit is mounted at one portion of the coolant flow path, such as the engine intake side. To adjust the temperature of the coolant to the required state, when the coolant temperature is low, the thermostat valve device closes the control valve and circulates the coolant through a bypass flow path without passing through the radiator, and when the coolant temperature is high, the thermostat valve device opens the control valve and circulates the coolant through the radiator.

Conventionally, a variety of structures are known for this type of thermostat valve device, such as that shown in JP-H02-011289-U, for example.

Briefly, in this thermostat valve device, the installation position of the device within the engine cooling system is a fluid confluence where the coolant flow path from the radiator intake and the flow path from the bypass flow path from the engine outlet and further to the engine intake come together. To solve the problem of inaccuracy in the temperature detection at the thermostat temperature sensitive part provided facing the interior of the fluid flow path due to disturbances in the flow of coolant and unevenness in temperature of the coolant that arises therefrom, this invention forms irregularities along the fluid flow path in the wall on which the thermostat temperature sensitive part is mounted to revolve the fluid tactilely and churn it, making the coolant temperature uniform.

However, with the conventional thermostat valve device as described in JP-H02-011289-U, a loss of pressure due to disturbance of the flow of fluid through the fluid flow path where the thermostat valve device is installed is unavoidable. To secure a predetermined supply flow volume it is necessary to increase the fluid pressure, which in turn causes other practical problems such as an increase in the size of the pump or other compressor means and in the overall size of the apparatus.

SUMMARY OF THE INVENTION

The present invention is conceived in light of the problems described above and has as its object to achieve a fluid control valve assembly that, in a fluid flow path including a fluid control valve, reduces pressure loss as much as possible, thereby minimizing the pressure for circulating the fluid and securing the necessary flow volume without an increase in the overall size of the assembly.

To achieve this objective, the present invention provides a fluid control valve assembly comprising an upstream chamber formed upstream from a valve unit that opens and closes a fluid flow path and has a valve seat and a valve element inside a valve housing; and an upstream pipe disposed on and facing the upstream chamber at a predetermined angle to a valve axis and forming an upstream side of the fluid flow path, wherein a swelling is formed in a portion of a wall of the upstream chamber that projects into the interior of the chamber so as to rectify and guide fluid flowing in from the upstream pipe toward the valve unit so that the fluid flows smoothly.

The upstream chamber inside the valve housing described above is formed as a substantially semispherical dome shape, and configured so that fluid from the upstream pipe connected thereto flows through the upstream chamber and downstream through a flow path between the valve seat and valve element that form the valve unit.

The swelling may be provided at a location disposed opposite the location of the upstream pipe.

The swelling formed in the wall of the upstream chamber of the valve housing may have a surface exposed to the wall in a vertical cross-section including an axis line of the upstream pipe that has a substantially arc-shaped form.

The swelling may be provided at any place in a circumferential direction of the wall of the upstream chamber of the valve housing other than within an angular range around the valve axis within which is positioned an opening to which the upstream pipe is connected.

With the fluid control valve assembly of the present invention as described above, a swelling is provided in a wall of the upstream chamber inside the valve housing into which coolant flows from the upstream pipe to rectify the flow of the fluid and guide it toward the valve unit, so that despite its simple structure it can reduce pressure loss along an expanding flow path and make the flow volume distribution around the valve uniform. Moreover, the present invention has the advantage of rendering the conventional guide plates provided to guide the flow and the spaces for their installation unnecessary, and further, there is no need to machine complicated shapes for the valve housing, pipe, etc.

More specifically, the present invention is configured so as to be able to smoothly rectify and guide the flow of the fluid that flows through the flow path, and a slight alteration in the shape of the valve housing is able to prevent an increase in pressure loss inside the flow path and thus minimize the fluid pressure needed to circulate the fluid. As a result, among the various superb effects achieved is that the necessary flow volume is attainable without any increase in the overall size of the assembly.

Moreover, since it is possible to minimize the pressure loss over the entire system as a result, it is possible to make the pump or other such compressor more compact.

In addition, according to the present invention, because the surface of the swelling is formed into the shape of an arc, fluid that flows into the upstream chamber of the valve housing flows smoothly along the arc-shaped surface, while at the same time space is secured to allow the fluid to flow to the non-swollen portion, thus providing a degree of freedom to the destination of the fluid and therefore minimizing flow resistance, thereby enabling pressure loss to be reduced as a result.

Further, according to the present invention, by providing the arc-shaped surface of the swelling near the center of the valve housing, the flow path for the fluid that flows from the inlet of the upstream pipe, past the surface of the swelling, and to the flow path (gap path) between the valve seat and the valve element of the valve unit is made smooth, and it is possible to make the fluid flow smoothly in optimal form.

In addition, according to the present invention, provided that the position is one that avoids the opening to which the upstream pipe is connected, the swelling may be provided at any location along the wall of the upstream chamber of the valve housing, providing a large degree of design freedom and to great effect. Further, since there is little limitation on the precise position of this type of swelling, it is possible to mount the upstream pipe on the valve housing laterally offset with respect to the valve axis, with the advantage that the effects of doing so are obtainable.

DETAILED DESCRIPTION OF THE PREFERRED EMBODIMENTS

Figure 1:
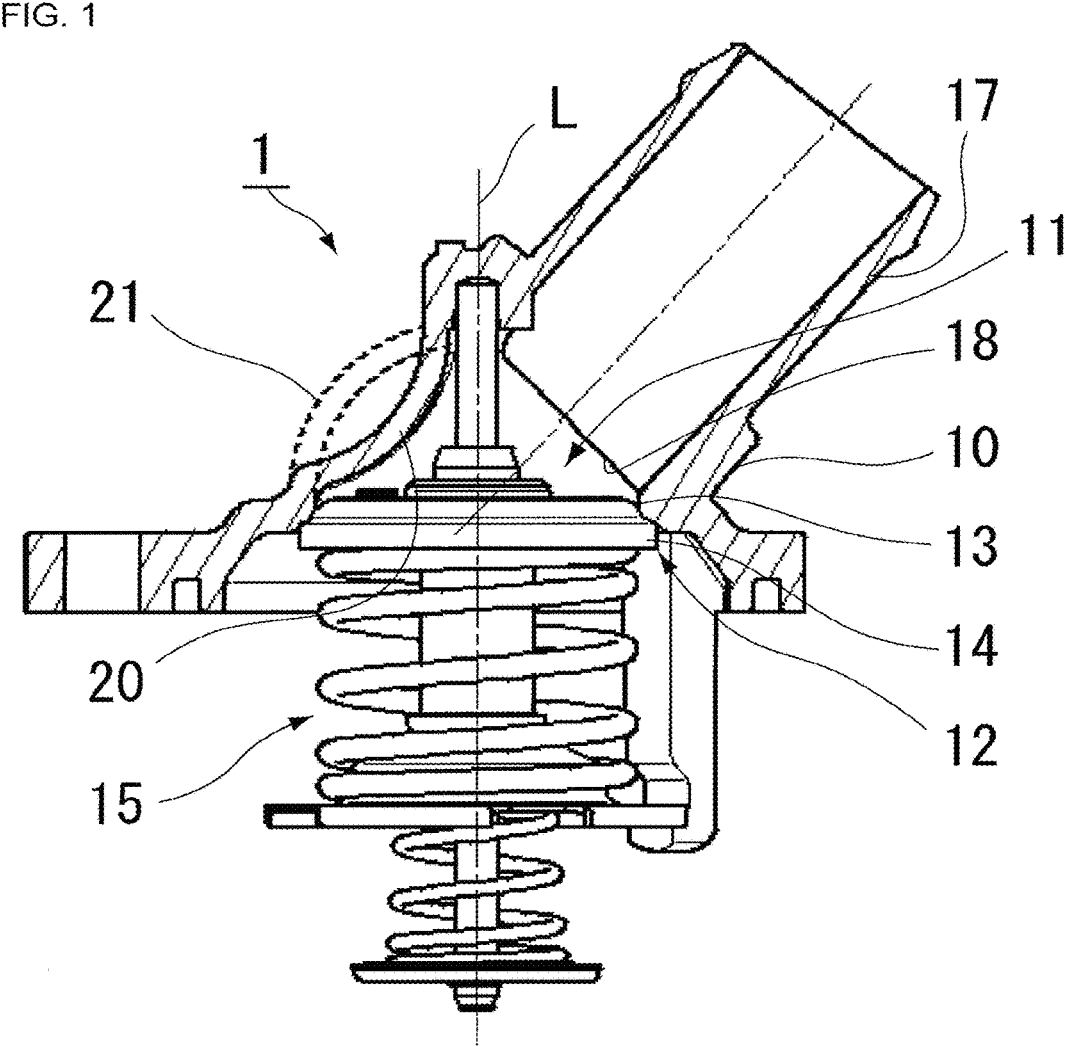
FIG. 1 is a schematic cross-sectional view of a thermostat valve device as a fluid control valve assembly according to the present invention.
Figure 4:
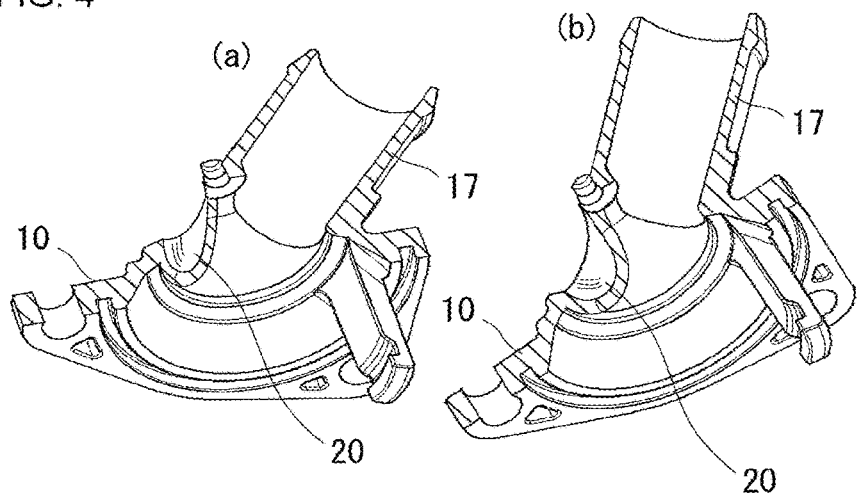
FIGS. 4(a) and 4(b) are schematic cross-sectional views of the valve housing shown in FIG. 3 along a line IV-IV, tilted backward.

FIG. 1 and FIG. 4 show one embodiment of a fluid control valve assembly according to the present invention. In this embodiment, a description is given of a case in which the fluid control valve assembly is adapted to a thermostat valve device that switches the flow path of coolant in a cooling device of an internal combustion engine.

In these drawings, reference numeral 1 denotes a thermostat valve device that constitutes an automobile engine cooling device. Although not shown in the drawings, within the cooling system that circulates engine coolant between the engine and a radiator the thermostat valve device 1 is provided at the engine intake, and is configured so as to switch the flow path of the coolant, such that, when the coolant temperature is high, coolant from the radiator is sent into the engine intake, and when the coolant temperature is low, coolant from the engine outlet and sent directly to the engine intake, bypassing the radiator.

Figure 2:
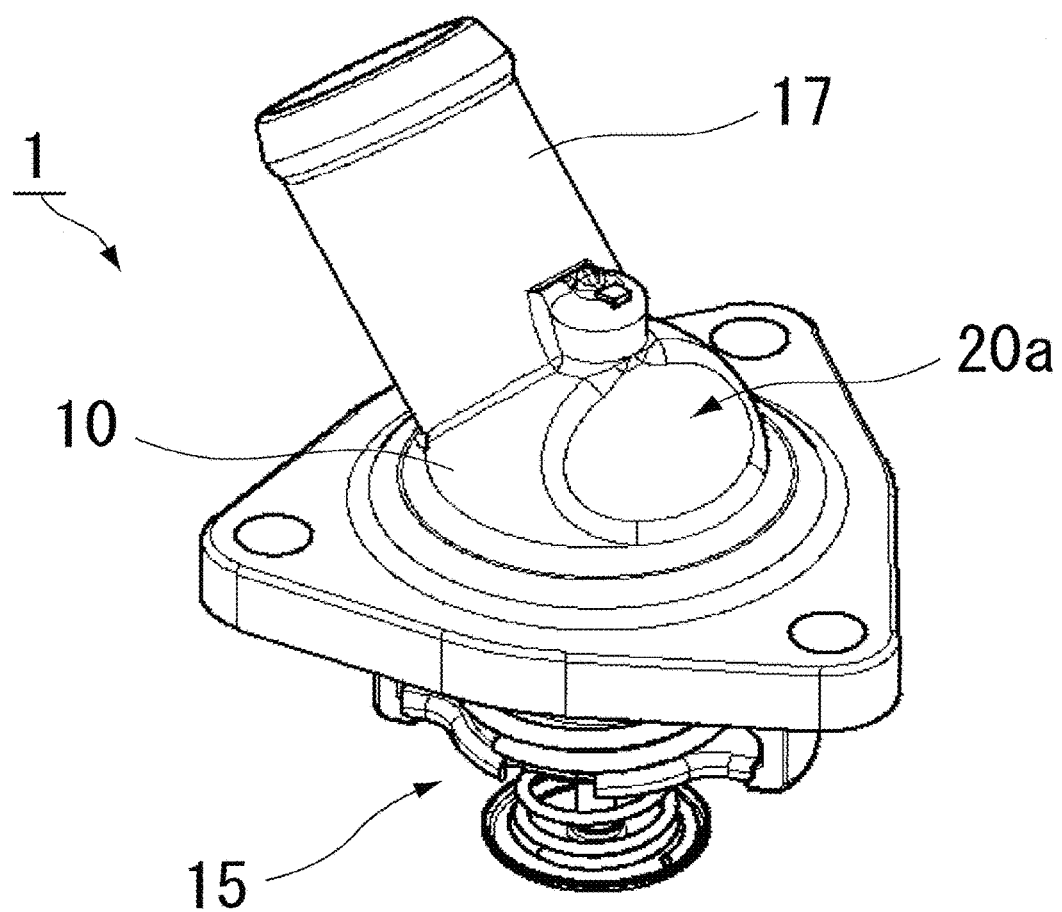
FIG. 2 is a schematic perspective view of the thermostat valve device shown in FIG. 1.
Figure 3:
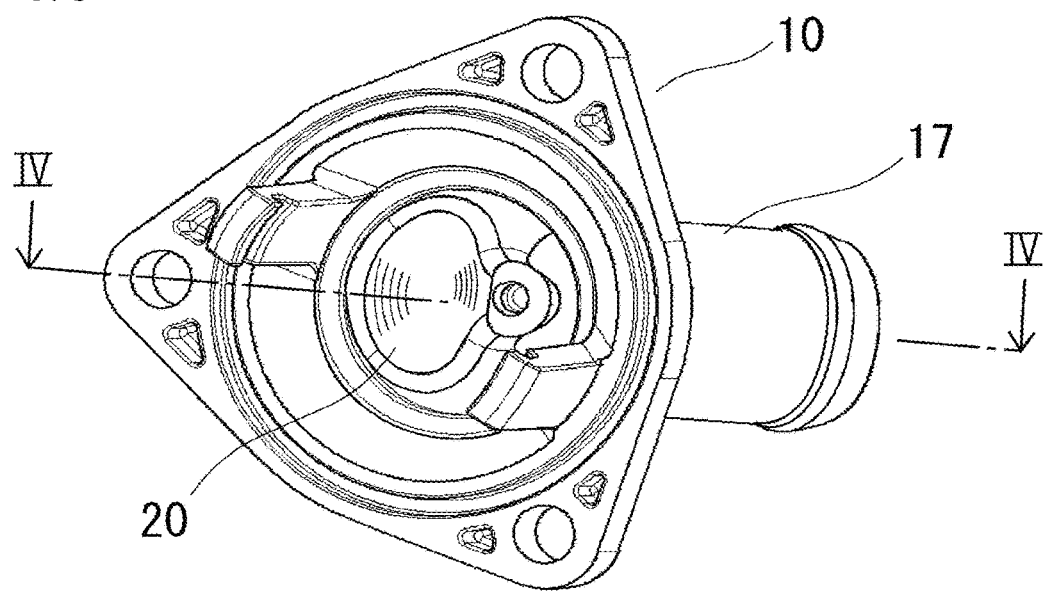
FIG. 3 is schematic perspective view of a valve housing of the thermostat valve device shown in FIG. 1 and FIG. 2.

In FIGS. 1 and 2, reference numeral 10 denotes a valve housing, in an interior of which is formed an upstream chamber 11 into which upstream coolant from the radiator flows.

Downstream of the valve housing are formed, as a valve unit 12 a valve seat 13 capable of opening and closing the fluid flow path downstream chamber 12 together with a valve element 14 whose operations of advancing toward and retreating from the valve seat 13 close and open the valve.

Reference numeral 15 denotes a thermostat assembly as a valve assembly into which a piston and a return spring that move a thermostat temperature sensitive part and the valve element 14 are integrated as a single unit. The thermostat temperature sensitive part controls the operation of the valve, causing the piston to move the valve element 14 in the open direction when the coolant temperature is high and closing the valve when the coolant temperature is low. It is to be noted that this type of operation of the thermostat valve is well known, and thus a detailed description thereof is omitted.

In the present embodiment, although omitted from the drawings, as with the device according to JP-H02-011289-U, a device housing that connects the flow path to the engine intake and a bypass flow path from the engine outlet is installed downstream of the valve housing 10, and is mounted at a predetermined position on the automobile engine or the like.

An upstream portion of the valve housing 10 has a substantially semispherical shape, in an interior of which is formed the upstream chamber 11 of substantially identical shape. A pipe 17 is attached to the upstream chamber 11 at a predetermined angle with respect to a valve axis L that is the center axis of the valve unit 12. In the engine cooling system the upstream pipe 17 is connected to the radiator, and coolant cooled by the radiator is selectively supplied to the engine intake through the thermostat valve device.

According to the present invention, in this embodiment the upstream pipe 17 is connected to a portion in the circumferential direction of the wall surface of the upstream chamber 11 described above. A portion of the upstream pipe 17 facing an opening 18 that is the entry into the upstream chamber is made to protrude into the interior of the chamber 11, thus providing a swelling 20 so that the incoming flow from the upstream pipe 17 is rectified and guided so as to flow smoothly toward the flow path (gap path) formed by the valve seat 13 and the valve element 14 at the valve unit 12.

In the present embodiment, the swelling 20 is shaped like a column pressed against a semispherical dome from the outside, such that it swells into the interior of the upstream chamber 11 in a semi-column shape. More specifically, the swelling 20 formed in the wall surface of the upstream chamber 11 of the valve housing 10 has a surface exposed to the wall in a vertical cross-section including an axis line of the upstream pipe 17 that has a substantially arc-shaped form.

In FIG. 1, reference numeral 21 denotes a dome shape of the conventional type that is not provided with this swelling 20. In FIG. 2, reference numeral 20a denotes an indentation in the housing 10 corresponding to the swelling 20.

According to the above-described thermostat valve device 1, the swelling 20 is formed in a wall surface of the upstream chamber 11 inside the valve housing 10 into which coolant from the upstream pipe 17 flows, and the flow of coolant is rectified and guided toward the flow path (gap path) between the valve seat 13 and the valve element 14. Thus, despite its simple structure, the thermostat valve device 1 can minimize pressure loss in a flow path having a complex diameter and make the pressure distribution at the valve area uniform.

Also, according to the present invention, the conventional guide plates provided to guide the flow and moreover the spaces for their installation are unnecessary, and further, there is no need to machine complicated shapes.

Figure 5:
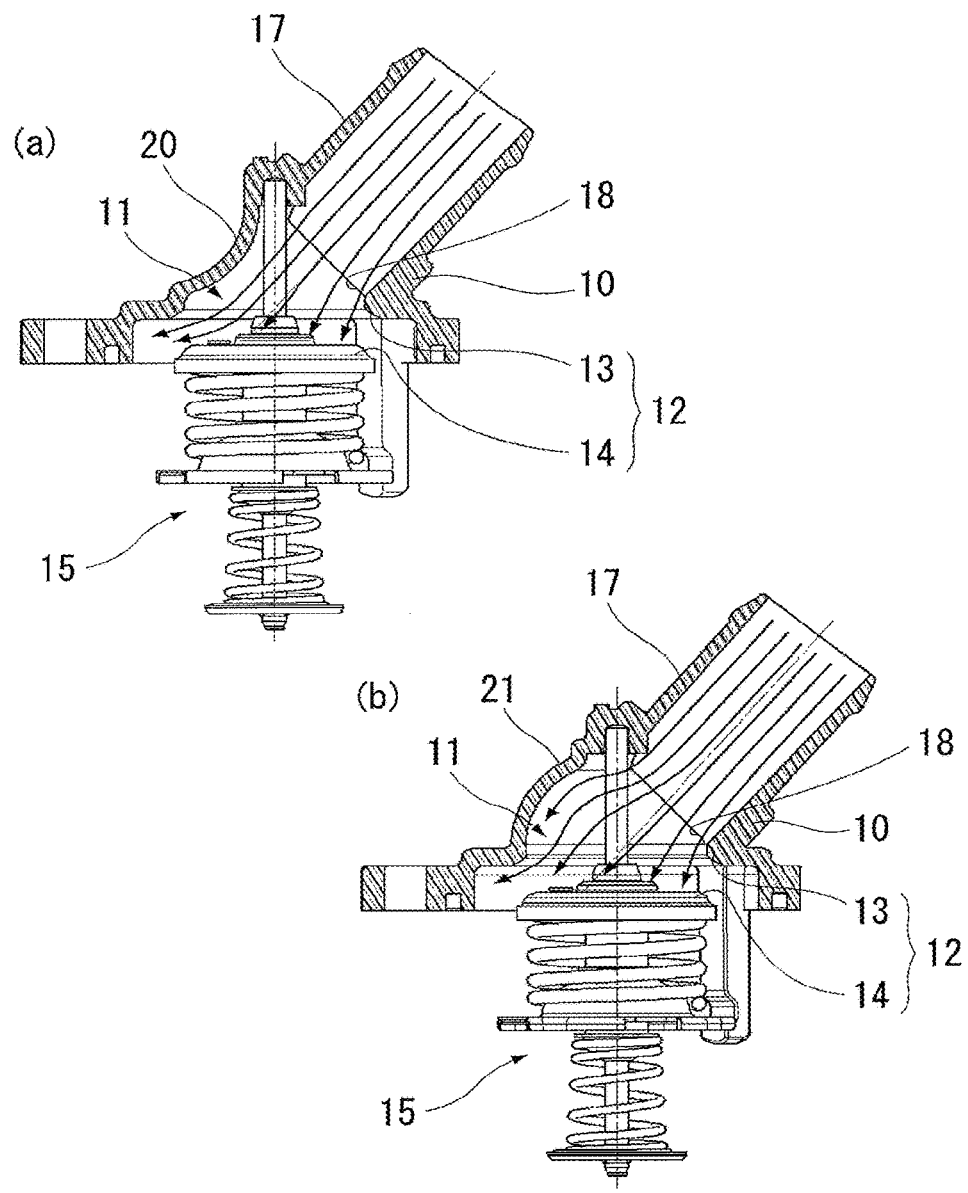
FIG. 5(a) is a schematic cross-sectional view illustrating fluid flow when the thermostat valve device is open and FIG. 5(b) is a schematic cross-sectional view illustrating fluid flow in the conventional structure.

In other words, as is clear from the difference between FIGS. 5(a) and (b), the device 1 of the present invention is configured so as to be able to smoothly rectify and guide the flow of the fluid that flows through the flow path to the maximum extent possible, and as a result a slight alteration in the shape of the valve housing 10 is able to reduce pressure loss inside the flow path and thus minimize the fluid pressure needed to circulate the fluid as well. As a result, the necessary flow volume is attainable without any increase in the overall size of the device. Moreover, since it is possible to minimize the pressure loss over the entire system, it is possible to make the pump or other such compressor more compact.

In addition, with the device 1 of the present invention, because the surface of the swelling 20 is shaped like an arc, the fluid that flows into the upstream chamber 11 of the valve housing 10 flows smoothly along the surface of the are shape while at the same time space is secured to allow the fluid to flow to the non-swollen portion, thus providing a degree of freedom to the destination of the fluid and therefore minimizing flow resistance, thereby enabling pressure loss to be reduced as a result.

It is to be noted that although in the present embodiment the swelling 20 has a semi-column shape, the present invention is not limited thereto.

More specifically, providing a partition plate to the upstream chamber 11 or forming the wall of the interior of the upstream chamber into the shape of a mortar complicates the flow of the fluid and does not allow a reduction in the loss of pressure. However, even forming the swelling as a portion of the inner wall of the upstream chamber 11 formed into the shape of a flat surface along the interior of the upstream pipe, for example, or as a swelling with an are surface having a suitable curvature, or further as a semi-spherical swelling or other such shape, can still provide substantially the same or better pressure loss reduction as that of the embodiment described above, and is thus capable of providing the prescribed effect.

The applicant has confirmed the effects of these swellings of various shapes. For example, as the results of the aforementioned experiments, it was confirmed through experiments that when the upstream chamber 11 was formed into the shape of a mortar the degree of freedom with which the coolant flowed was drastically reduced, and conversely the pressure loss increased.

Figure 6:
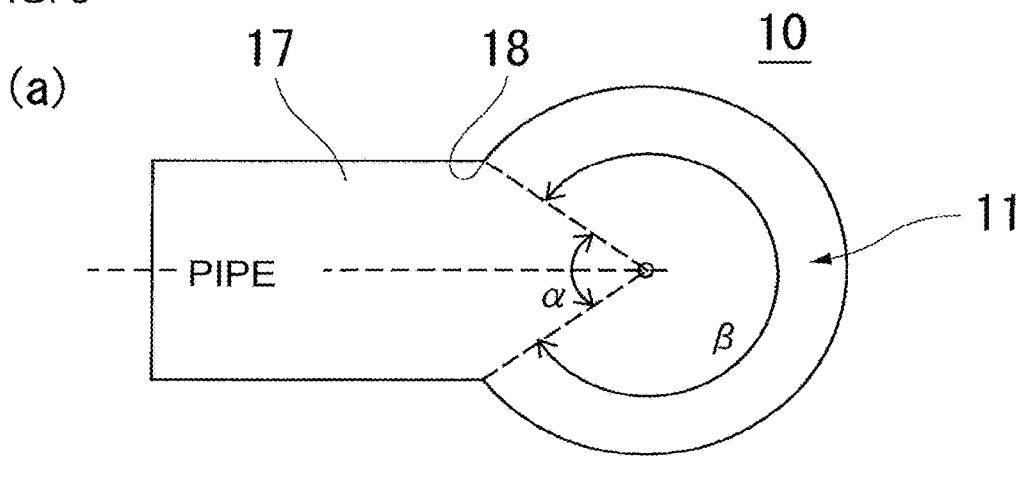
FIGS. 6(a) and 6(b) is a diagram illustrating a location in a wall surface of an upstream chamber of the valve housing of a swelling that is a distinctive feature of the present invention.
Figure 6:
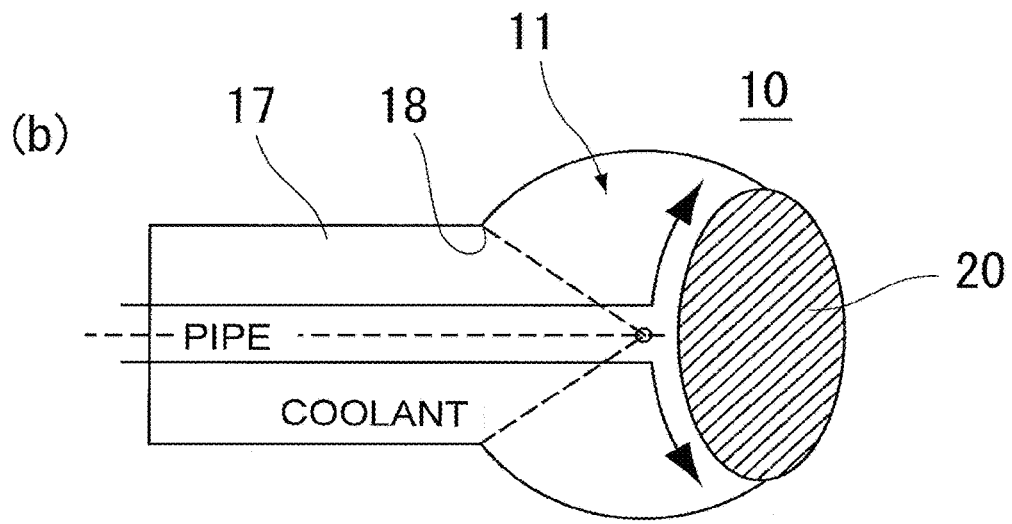

FIGS. 6(a) and (b) are diagrams illustrating that it is possible to position the swelling 20, which is a distinctive feature of the present invention, anywhere along the circumferential direction in the upstream chamber 11 of the housing 10.

Through varied trial and error, the applicant has confirmed through experiments that the swelling 20 may be placed anywhere along the wall of the upstream chamber 11 of the valve housing 10 around the valve axis L (shown in the drawing as angular range β) except for an angular range a where the opening 18 at which the upstream pipe 17 is connected is positioned.

More specifically, provided that the position is one that avoids the opening 18 to which the upstream pipe 17 is connected, the swelling 20 may be provided at any location along the wall of the upstream chamber 11 of the valve housing 10, providing a large degree of design freedom and to great effect. That is, as shown in FIG. 6(b), the fluid that flows in strikes the surface of the swelling 20 and flows around it, but space is secured and a smooth flow is achieved.

Further, there is little limitation on the precise position of this type of swelling 20, and therefore if for reasons of insertion position of the device 1 in the valve housing 10 the upstream pipe 17 is mounted on the valve housing laterally offset with respect to the valve axis L it is possible to so mount the upstream pipe 17, and the effects of doing so are obtainable.

Figure 7:
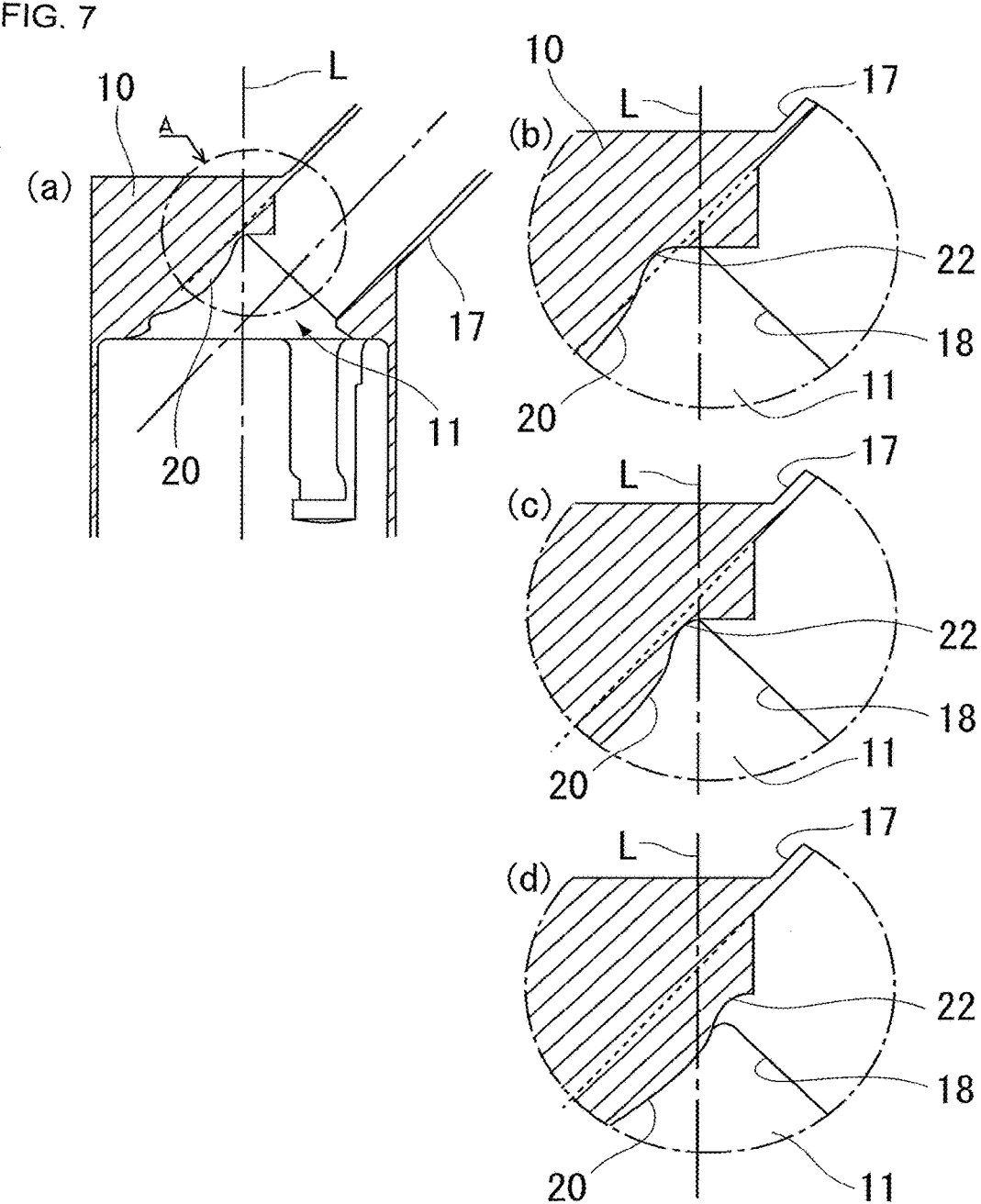
FIG. 7(a) is a diagram illustrating a formed state of the swelling that is a distinctive feature of the present invention, and FIGS. 7(b), (c), and (d) show details of a portion A shown in FIG. 7(a).

FIG. 7 is a diagram illustrating the relative positions of the arc-shaped surface of the swelling 20 and other parts thereof.

A top end 22 of the arc-shaped surface of the swelling 20 in the wall of the upstream chamber may be formed so as to project into the center of the valve housing 10 up to a point where the valve axis L, which is the center axis of the valve unit 12 intersects the opening 18 in the wall of the upstream chamber 11 of the valve housing 10 to which the upstream pipe 17 is connected.

More specifically, depending on the position of the arc-shaped surface of the swelling 20, it is possible to expand smoothly the diameter of the upstream pipe 17 and the diameter of the opening of the valve unit 12. However, at the position shown in FIG. 7(d), which sacrifices the diameter of the inlet from the pipe 17, the arc-shaped surface of the swelling 20 interferes too much with the flow of the fluid. Alternatively, at the position shown in FIG. 7(b), which, while not sacrificing the inlet diameter, also does not protrude very much, the arc-shaped surface does not affect the incoming fluid, and therefore the fluid is not guided to the flow path (gap path) between the valve seat 13 and the valve element 14 of the valve unit 12 and a smooth flow cannot be obtained.

Investigating this point as well, the arc-shaped surface of the swelling 20 is set at the position shown in FIG. 7(c), so that the flow of the fluid from the intake of the pipe 17 past the swelling 20 to the flow path (gap path) between the valve seat 13 and the valve element 14 of the valve unit 12 becomes smooth (as is clear from a comparison of FIGS. 5(a) and (b)).

Here, of FIGS. 7(b), (c), and (d), the most preferred shape is that shown in FIG. 7(c); it is more effective than either the shape like that shown in FIG. 7(b), which, while not sacrificing the inlet diameter, also does not protrude very much, or the shape like that shown in FIG. 7(d), which does sacrifice the diameter of the inlet. Still, it goes without saying that even the shapes shown in FIGS. 7(b) and 7(d) are expected to have some effect due to the provision of the semi-column-shaped swelling 20. Of the shapes shown in 7(b), 7(c), and 7(d), the most effective is that of 7(c), followed by 7(d) and then 7(b).

Therefore, by configuring the arc-shaped surface of the swelling 20 as described above and by providing it near the center of the valve housing 10, the flow path for the fluid that flows from the inlet of the upstream pipe 17, past the surface of the swelling 20, and to the flow path (gap path) between the valve seat 13 and the valve element 14 of the valve unit 12 is made smooth, and it is possible to make the fluid flow smoothly in optimal form.

It is to be noted that the present invention is not limited to the structures described in the foregoing embodiments, and the shapes and structures of the various parts that configure the thermostat valve device 1 fluid control valve assembly may be varied or modified as needed.

The present invention is not limited to the thermostat valve device 1 used in a cooling device for an internal combustion engine as described in the foregoing embodiments, and is applicable to any fluid control device that controls a variety of fluids.

What is claimed is:

1. A fluid control valve assembly comprising:
   a valve unit configured to open and close a fluid flow path to control an amount of fluid flow, the valve unit comprising a piston fixed to the upstream chamber at a connection point; and
   an upstream chamber disposed upstream of the valve unit, the upstream chamber formed of spherical walls and an inwardly protruding bulge separate from the connection point, the upstream chamber defined by the spherical walls, the inwardly protruding bulge, an opening of an upstream pipe configured to supply fluid to the valve unit, and the valve unit,
   wherein the upstream pipe is disposed on a portion of the upstream chamber and configured to supply fluid to the valve unit.

2. The fluid control valve assembly according to claim 1, wherein the fluid is supplied at a predetermined angle to a valve axis of the valve unit.

3. The fluid control valve assembly according to claim 2, wherein the inwardly protruding bulge is disposed between a valve seat of the valve unit and the opening of the upstream pipe.

4. The fluid control valve assembly according to claim 2, wherein the predetermined angle is non-orthogonal and non-parallel to the valve axis.

5. The fluid control valve assembly according to claim 2, wherein the inwardly protruding bulge is disposed on an opposite side of the valve axis from the opening of the upstream pipe.

6. The fluid control valve assembly according to claim 2, wherein the inwardly protruding bulge does not intersect the valve axis.

7. The fluid control valve assembly according to claim 1, wherein the inwardly protruding bulge has a shape of a portion of an outer surface of a cylinder.

8. The fluid control valve assembly according to claim 1, wherein the predetermined angle is non-parallel to the valve axis.

9. The fluid control valve assembly according to claim 1, wherein the predetermined angle is non-orthogonal to the valve axis.

10. A fluid control valve assembly comprising:
    a valve inlet;
    a valve outlet; and
    a chamber for transitioning the flow from the valve inlet to the valve outlet and located upstream of a seat of the valve, the chamber being defined by spherical walls intersected by the valve inlet on one side and a first inwardly protruding cylindrical surface on an opposite side,
    wherein the valve inlet defines a first flow axis and the valve outlet defines a second flow axis and the chamber transitions the flow from the first flow axis to the second flow axis, and
    wherein an axis of the first cylindrical surface is oriented perpendicularly to the first flow axis and the second flow axis.

11. The fluid control valve assembly according to claim 10, wherein the first flow axis is non-parallel and non-orthogonal to the second flow axis.

12. The fluid control valve assembly according to claim 10, wherein the first cylindrical surface does not intersect the second flow axis.

13. The fluid control valve assembly according to claim 10, wherein the first flow axis is non-parallel to the second flow axis.

14. The fluid control valve assembly according to claim 10, wherein the first flow axis is non-orthogonal to the second flow axis.

15. A fluid control valve assembly comprising:
    a valve inlet;
    a valve outlet; and
    a chamber for transitioning the flow from the valve inlet to the valve outlet and located upstream of a seat of the valve, the chamber being defined by spherical walls intersected by the valve inlet on one side and a rectifying means for rectifying the fluid flow and reducing pressure loss in the valve assembly.

16. The fluid control valve assembly according to claim 15, wherein the valve inlet defines a first flow axis and the valve outlet defines a second flow axis and the chamber transitions the flow from the first flow axis to the second flow axis.

17. The fluid control valve assembly according to claim 16, wherein the first flow axis is non-parallel and non-orthogonal to the second flow axis.

18. The fluid control valve assembly according to claim 16, wherein the rectifying means for rectifying the fluid flow and reducing pressure loss in the valve assembly does not intersect the valve axis.

19. The fluid control valve assembly according to claim 15, wherein the first flow axis is non-parallel to the second flow axis.

20. The fluid control valve assembly according to claim 15, wherein the first flow axis is non-orthogonal to the second flow axis.

* * * * *